(12) United States Patent
Wiemker (10) Patent No.: US 7,298,879 B2
(45) Date of Patent: Nov. 20, 2007

(54) COMPUTER-AIDED DETECTION OF LUNG NODULES

(75) Inventor: Rafael Wiemker, Kisdorf (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 437 days.

(21) Appl. No.: 10/535,465

(22) PCT Filed: Nov. 12, 2003

(86) PCT No.: PCT/IB03/05136

§ 371 (c)(1),
(2), (4) Date: May 17, 2005

(87) PCT Pub. No.: WO2004/046995

PCT Pub. Date: Jun. 3, 2004

(65) Prior Publication Data

US 2006/0050939 A1    Mar. 9, 2006

(30) Foreign Application Priority Data

Nov. 20, 2002 (EP) .................................. 02079814

(51) Int. Cl.
    *G06K 9/00* (2006.01)
(52) U.S. Cl. ...................... 382/128; 382/131; 382/154; 382/164; 382/173; 382/254; 382/257; 382/260; 382/276; 600/407
(58) Field of Classification Search ................ 382/128, 382/131, 154, 164, 173, 254, 257, 260–276; 600/407
See application file for complete search history.

(56) References Cited

U.S. PATENT DOCUMENTS 6,396,939 B1 *   5/2002   Hu et al. .................... 382/128

(Continued)

OTHER PUBLICATIONS

Shyn-Liang Lou, et al; Object-based Deformation Technique for 3-D CT Lung Nodule Detection; SPIE vol. 3661 pt1-2; Feb. 1999; pp. 1544-1552.

*Primary Examiner*—Samir Ahmed
*Assistant Examiner*—Nancy Bitar (57) ABSTRACT

The invention relates to a method and a device for forming an image of body structures from an image data set, notably for highlighting potential nodular structures (KI; KA) in a lung. The problem to be solved by the invention is to achieve automatic highlighting of potential nodular structures in methods of this kind. This is realized in that in a plurality of steps a binary data set is formed in which all pixels present in the image data set are subdivided into pixels to be marked and those not to be marked, a first filtering operation being performed in which for each pixel (D) there is determined a distance value which corresponds to the shortest distance between the pixel and the edge (KAG) of the image structure (KA) in which the pixel is situated, those pixels being selected from the binary data set whose distance value is below a predetermined distance limit value, there being performed a second filtering operation in which those previously selected pixels remain selected which are directly neighbored by two pixels having a smaller distance value in both directions of at least one straight line which extends through the pixel, there being performed a third filtering operation in which those previously selected pixels remain selected for which the surrounding pixels, being situated at a distance corresponding to the distance value of the pixel, have a distance value which is a predetermined distance difference value smaller than the distance value of the pixel to be tested itself, the pixels thus selected being used to form an image in which the selected pixels are highlighted.

14 Claims, 10 Drawing Sheets

LU

U.S. PATENT DOCUMENTS

2002/0114530 A1* 8/2002 Duarte .................. 382/254
2004/0022424 A1* 2/2004 Seissler et al. ............ 382/128
2005/0036679 A1* 2/2005 Wiemker et al. .......... 382/173
2005/0190955 A1* 9/2005 Brown .................. 382/128
2006/0235288 A1* 10/2006 Lavi ..................... 600/407
2007/0003124 A1* 1/2007 Wood et al. ............. 382/131

* cited by examiner

COMPUTER-AIDED DETECTION OF LUNG NODULES

The invention relates to a method and a device for forming an image of body structures from an image data set. The invention is intended notably to highlight potential nodular structures in a lung.

Methods of the kind set forth are known for numerous applications in the field of medical imaging. In known methods a two-dimensional representation of the image elements or pixels contained in an image data set is formed from the image data set. Regularly a detail, a perspective and an enlargement factor can be chosen by a user. It is also known to perform a filtering operation on the pixels during the formation of the image in order to exclude pixels which are irrelevant for the diagnosis from the image.

In the known methods for forming an image of body structures often the problem is encountered that the viewer of the image is presented with a large amount of image information and that it is difficult to discover given, notably small image structures in the image. Small, enclosed body structures within the image, however, are often of high diagnostic relevance, because they represent early stages of pathological developments. Recognition of such pathological structures at an early stage is often a prerequisite for the success of therapeutical steps.

In known methods for marking such small structures in images of body structures a plurality of filtering steps are carried out successively in order to filter out the relevant small structures. A method of this kind can be found, for example, in the article "Object based deformation technique for 3-D CT lung nodule detection", by Shyh Liang Lou et al., Proceedings of the SPIE Vol. 3661, PT. 1-2, pp. 1544 to 1552, 1999. According to the known method an isolated representation of the organ to be observed is regularly obtained by means of pre-filtering steps and subsequently a search is performed within this organ, using geometrical criteria, so as to find structures of a given type, notably round structures. This approach utilizes complex geometrical selection and exclusion criteria which cannot be followed by a user of the method. Furthermore, the known methods do not ensure a reliable representation of all potential nodular structures. The trust of the user in the automatic filter steps for the pre-selection of potential pathological structures, therefore, is limited and further reduced by the fact that the method is not transparent.

Therefore, it is an object of the invention to provide a method and a device for the formation of an image of body structures which enables more reliable marking of potential pathological image structures in comparison with known methods.

The object is achieved by means of a method of the kind set forth which comprises the following steps:

a) forming a binary data set in which the pixels present in the image data set are subdivided into pixels which are to be marked and those which are not to be marked, in which step a1. a first filtering operation is performed in which a distance value is determined for each pixel, which distance value corresponds to the shortest distance between the pixel and the edge of the image structure in which the pixel is situated and in which those pixels whose distance value is below a predetermined distance limit value are selected from the binary data set, a2. a second filtering operation is performed in which those previously selected pixels remain selected which are directly neighbored, in both directions of at least one straight line extending through the pixel, by two pixels having a smaller distance value, a3. a third filtering operation is performed in which those previously selected pixels remain selected for which the surrounding pixels, situated at a distance corresponding exactly to the distance value of the pixel, have a distance value which is a predetermined distance difference value smaller than the distance value of the pixel to be tested itself, b) forming a marked image data set from the image data set by marking the pixels which have been selected after the last filtering operation in the binary data set, and c) forming the image of the body structure from the marked image data set.

The method in accordance with the invention enables the formation of an image of body structures in which given pixels are marked, notably highlighted, that is, pixels which are of primary importance for the evaluation of pathological structures. The pixels to be marked are determined from the total number of pixels of the image data set by means of three filtering operations which can be simply followed.

During a first filtering operation all pixels are determined which are situated less than a predetermined distance from the edge of the image structure in which they are present. All pixels of image structures can thus be determined whose dimensions are less than twice the predetermined distance limit value. Furthermore, this first filtering operation determines all pixels which are situated in the edge zone of large image structures, said edge zone having a thickness corresponding to the distance limit value.

In this context an image structure is to be understood to mean a coherent surface which is formed by a plurality of neighboring pixels which on the one hand neighbor one another and, moreover, present themselves to a viewer as being coherent on the basis of a second criterion. This second criterion may be, for example, correspondence or similarity of the image value of the pixels. Furthermore, other known filter methods can be used as a second criterion, for example, the water shed transformation, the morphological aperture or similar methods.

During the second filtering operation, all those pixels which represent a local distance value maximum in at least one direction are determined from the pixels determined during the first filtering operation. In at least two opposite directions, that is, in a first direction and in a second direction which deviates 180° therefrom, these pixels are surrounded directly by pixels which are situated at a distance from the edge of the image structure which is smaller than the distance value of the pixel itself.

Thus, during the second filtering operation all pixels are selected which represent the center or the center line of a small image structure. Visually speaking, if the distance values of the pixels are seen as altitude values in a topographic map, the pixels situated on a mountain ridge or a mountain top are selected during the second operation.

During the third filtering operation, subsequent to the second filtering operation, from among these pixels there are selected those pixels which are not enclosed by any pixel within a distance which corresponds exactly to their distance value in an arbitrary direction, that is, by no pixel whose distance value is equal to the distance value of the pixel itself or deviates only slightly therefrom. Thus, all those elements are rejected which have been selected after the second filtering operation and are situated in the edge zone of a large image structure, and hence are enclosed in at least one direction, that is, in the direction towards said larger image structure, by a pixel at the relevant distance whose distance value is significantly larger than the distance value of the pixel itself.

Furthermore, the third filtering operation excludes all pixels which are not situated at the center of an approximately round image structure; the selection of the permissible distance difference value also leaving pixels of a structure selected when the structure deviates to a given degree from the ideal round structure. Visually speaking, in the previously described topographic map those pixels are excluded which represent the mountain ridge lines in elongate image structures, whereas the pixels which represent the top in round, oval or similarly bounded image structures remain selected.

After the third filtering operation, a deliberately reduced number of pixels has been selected from the number of many, possibly relevant pixels, that is, by exclusion of irrelevant pixels, said selected pixels qualifying as centers of potential nodular structures. These pixels are then marked in a new image data set to be formed and hence can be represented in a separate way upon formation of the image of the body structure from this marked image data set. These pixels can notably be marked in color, be highlighted with enriched contrast, or be indicated by alternating fading in and out or in another manner.

In a first advantageous version of the method of the invention the first filtering operation is preceded by a filtering operation by means of limit values of the image values. This method of filtering, also known as thresholding, enables the selection of all pixels above a first image value limit value and/or below a second image value limit value in a simple filtering step. In as far as the image data set was acquired by way of computer tomography, this type of filtering can be applied by selecting pixels whose Hounsfield unit (HU) is below a predetermined, first HU and/or whose HU is above a second HU.

In a second advantageous further version of the method in accordance with the invention the pixel to be tested during the third filtering operation is rejected as not to be marked as soon as a surrounding pixel is found whose distance value is the predetermined distance difference value smaller than the distance value of the pixel to be tested itself. The filtering is accelerated as a result of this further development. Because a pixel is rejected during the third filtering operation if only one of the pixels situated at the distance corresponding tot the distance value has a distance value which is the predetermined distance difference value smaller, further testing of the pixels surrounding the pixel at a corresponding distance can be dispensed with as soon as the corresponding enclosing pixel is found. The required calculation capacity is thus reduced or the calculation time is reduced.

The method in accordance with the invention can be advantageously elaborated when the predetermined distance difference value is zero. It is thus achieved that each pixel which is surrounded, at a distance which corresponds exactly to the distance value, by pixels whose distance value deviates from the distance value of the pixel itself, remains selected and only those pixels are rejected which are surrounded by at least one pixel, at the corresponding distance, whose distance value is identical to that of the pixel itself.

A further advantageous version of the method in accordance with the invention comprises a fourth filtering operation in conformity with the characterizing part of claim 5. According to this further elaboration, pixels are excluded from the selection remaining after the third filtering operation if a pixel having a higher distance value is present within their image structure and/or if the image structure extends for more than a predetermined value in an arbitrary direction, meaning that the image structure exceeds a given size in an arbitrary direction.

In that case it can notably be arranged that the predetermined volume distance value corresponds to five times the distance value of the start element. It has been found that this limit value is suitable to exclude pixels of irrelevant image structures from the selection, that is, notably when potential nodular structures in the lung are to be marked.

The fourth filtering method can be further elaborated in that the region growth takes place point-symmetrically relative to the start element and the start element is rejected as not to be marked as soon as the mean value of the distance values of the included image elements is larger than a predetermined distance mean value which advantageously corresponds to the distance value of the start element.

In this context point-symmetrical growth is to be understood to mean that in a first step all elements which directly adjoin the start element are included by the region growth, that in a subsequent step all outer elements which directly adjoin these elements are included by the region growth, and so on. The mean value of the distance value of the included pixels is then the mean value of the distance value of all pixels included by the region growth.

It has been found that image structures which are point-symmetrically enclosed by such a region growth regularly are not potential pathological structures if at an arbitrary instant of the region growth the mean value of the distance value of all pixels included is larger than the distance value of the start element, that is, in as far as the start element is chosen to be one of pixels selected after the fourth filtering operation. This further version of the method in accordance with the invention thus refines the selection of potentially pathological nodular structures.

The described method can advantageously be elaborated in conformity with the characterizing part of claim 9.

The distance value sum then represents the sum of all distance values of those pixels which have been newly included in a phase of the region growth. These pixels are regularly situated on a geometry which is point-symmetrical relative to the start element, that is, on a circle in the case of a two-dimensional image and on a spherical surface in the case of a three-dimensional image. The distance value sum of the first phases of the region growth is then regularly larger than the distance value of the start element itself, because the sum of the plurality of pixels around the start element is larger than the distance value of the start element itself, even when the distance value of the individual pixels is smaller than that of the start element. The rise of the curve reaches a maximum and decreases again, in as far as the region growth takes place in a small, enclosed image structure, when the region growth includes increasingly pixels with small distance values.

The formation of a minimum in the curve and the subsequent rise of the curve can take place when pixels having larger distance values are included again by the region growth.

It has been found that the ratio of the distance value sum at a maximum to a ratio of the distance value sum at a subsequent minimum can be used as a criterion in respect of the probability that the start element belongs to a potential nodular structure. This is particularly unlikely when the distance value sum at the minimum is not larger than half the distance value sum at the maximum.

Furthermore, for a further advantageous development of the method it has been found that the quotient of the mean value of the distance values of all pixels included by the region growth until the local minimum is reached and the distance value of the start element can be used to determine the probability that the start element belongs to a potential nodular structure. It is particularly unlikely that the start element belongs to a potential nodular structure if the mean value of the distance values of all pixels included until the local minimum is reached is larger than twice the distance value of the start element.

The above method is advantageously further elaborated by defining the predetermined extreme value quotient to be 0.35. The filtering then obtained is finer than when the extreme value quotient is determined so as to be 0.5.

The method in accordance with the invention is further elaborated by carrying out a fifth filtering operation as disclosed in the characterizing part of claim 11. As a result of this elaboration it is achieved that pixels remain selected which were rejected in the fourth filtering operation on the basis of one of the conditions stated in the claims 5 to 10 and described above, because in the course of the region growth a second image structure which adjoins the first image structure or is directly fused therewith was included by the region growth. This may occur, for example, in the case of nodular structures which are situated in the wall region of a large image structure and are fused therewith or are connected thereto via vessels.

In this case the fourth filtering operation leads to the rejection of pixels of potential nodular structures, so that an incorrect diagnosis could be made. The fifth filtering operation imposes a boundary which is situated as exactly as possible at the transition between the first image structure and the second image structure. Subsequently, as in the fourth filtering operation, region growth is started as from a start element formed by the pixels remaining after the third filtering operation, the start element being rejected as not to be marked if at least one of the conditions of the fourth filtering operation according to the claims 5 to 10 is satisfied. However, pixels which, viewed from the start element, are situated to the other side of the boundary remain rejected according to this region growth, that is, pixels situated in the larger structure with which the potential nodular structure is fused.

The above method can be advantageously further elaborated by determining the boundary on the basis of the steps disclosed in claim 12. In this method of drawing a boundary, a plane boundary is drawn in that first those pixels are determined which are situated in the edge zone of the second image structure included by the region growth and are also situated at the edge of the region growth at the instant of the interruption conditions of the fourth filtering operation. Subsequently, a straight line (in the case of two-dimensional image processing) or a plane (in the case of three-dimensional image processing) is determined, which line is situated in space in such a manner that the sum of all distances between the straight line or the plane and the previously determined pixels is minimum. This plane or line constitutes a very good approximation of the transition between the first and the second image structure and hence can be used as a boundary line or plane.

A further aspect of the invention concerns a device which comprises means for carrying out the described steps of the method as well as a computer program with program means for carrying out said steps of the method.

The invention provides a method for forming images of body structures whereby a sensible reduction of the image data can be carried out by means of filtering steps which can be simply followed and understood and in which those pixels which represent potential nodular structures can be filtered out. The pixels thus filtered out can be represented either in isolated form or be highlighted, marked or otherwise identified in an overall image. The method in accordance with the invention thus enables a particularly reliable and fast localization of small, circumscribed nodular structures by a physician. The simply understood filtering steps of the method in accordance with the invention are suitable to enhance the trust of the user in the automatic detection of the nodular structures.

An advantageous version of the method will be described with reference to the accompanying Figures. Therein.

Figure 1:
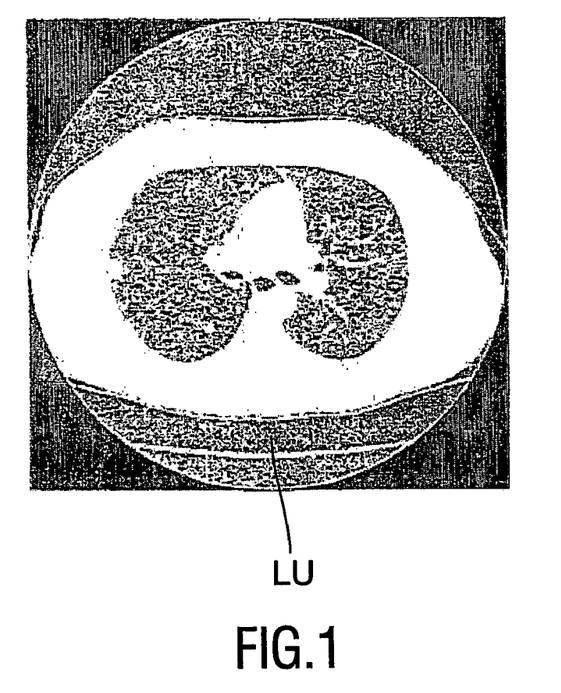
FIG. 1 shows a computer tomographic horizontal slice image of the region of the lungs of a human.

FIG. 1 is a horizontal sectional view of the body of a human. The image data wherefrom the slice image of FIG. 1 has been formed was acquired by means of a computer tomography X-ray method. The individual body structures are reproduced in corresponding shades of gray in dependence on their specific radiation transmissivity for X-rays. These shades of gray are referred to as Hounsfield Unit (HU) values. The image shown in FIG. 1 offers an expert physician a variety of information wherefrom the physician can derive specific information, such as the presence of diseased nodular structures, only by a thorough and time-consuming study.

In order to facilitate the extraction of such information, a filtering method as described in detail hereinafter is employed.

Figure 2:
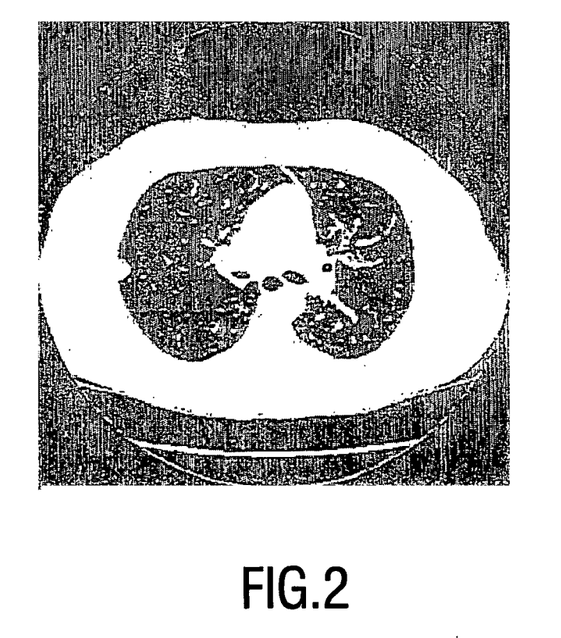
FIG. 2 shows an image as shown in FIG. 1 after filtering by means of image value limits.

To this end, first a black/white image with binary image data information is formed from the gray scale image of FIG. 1, that is, by subdividing all pixels into pixels having an image value above or below a HU value of −400. The HU value of −400 is a suitable limit value for making a decision between tissue structures on the one hand and ambient or trapped air and liquid on the other hand. Thus, in FIG. 2 the air trapped in the lung, the air surrounding the body and the blood in vessels appear in black, whereas the body surrounding the lung (essentially muscle tissue and bone tissue) and the heart in the lungs appear in white.

During a further filtering step a region growth is started in the space surrounding the body, so that the space surrounding the body is filled with the same image value as the tissue structure. Consequently, this space, that is the ambient air as well as the patient table LU, appears in white in FIG. 3.

Figure 3:
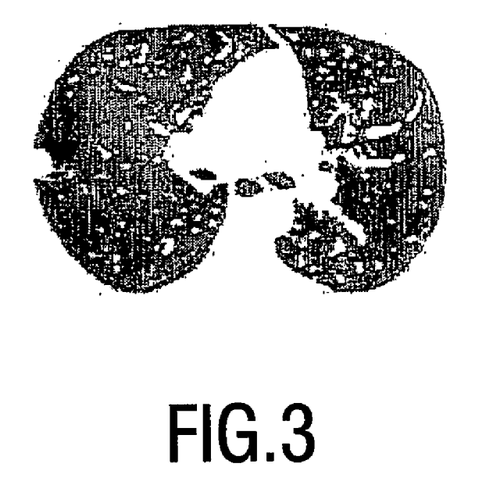
FIG. 3 shows an image as shown in FIG. 1 after the filling of the space surrounding the body.
Figure 4:
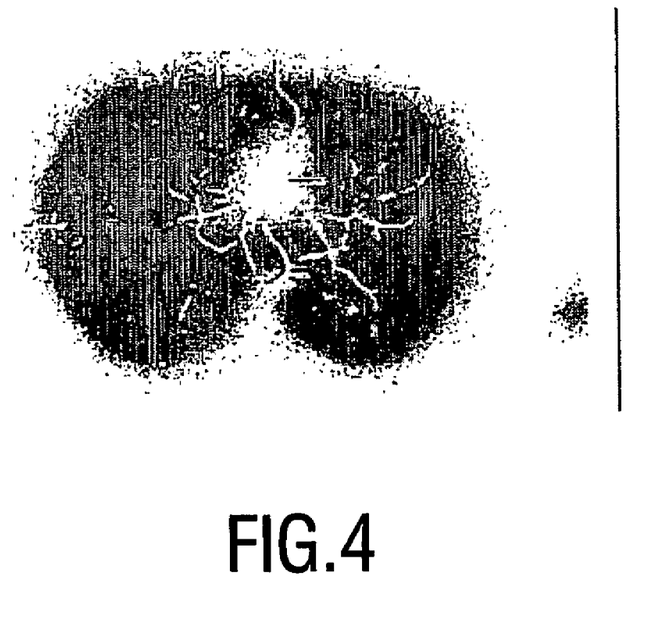
FIG. 4 shows an image as shown in FIG. 1 with distance values.

Subsequently, as a first step of the first filtering operation in conformity with claim 1 the distance value of all previously filtered-out white elements of FIG. 3 is determined and a corresponding distance value is assigned to each pixel. The shortest distance between the pixel and the edge of its image structure, that is, the shortest distance between the pixel and the nearest black/white boundary in FIG. 3, is then determined. Pixels at a very short distance from such a boundary are given a small distance value while pixels at a large distance are assigned a large distance value. The distance values of the pixels are shown in FIG. 4. In FIG. 4 small distance values are represented by large gray scale values and large distance values are represented by small gray scale values; thus, pixels with a small distance value are dark and pixels with a large distance value are bright in FIG. 4.

According to a second step of the first filtering operation all pixels are selected whose distance value is below a predetermined distance limit value, for example, 30 mm. Thus, the further filtering steps take into account only pixels which belong to white image structures in FIG. 3 whose dimensions are less than 60 mm or are situated at a distance of less than 30 mm from black pixels.

During a second filtering operation, these pixels are tested as to whether they are enclosed, in at least two 180° mutually offset directions, exclusively by pixels whose distance value is smaller than its own distance value. This is shown by way of example for two pixels A, B in FIG. 5. Pixel A is situated at the center of a nodule which is fused with a wall. By way of example, four axes A1 to A4 are plotted so as to extend through the pixel A. As can be readily seen in FIG. 5, for example, on the axis A4 in the direct vicinity of the pixel A there are situated pixels whose distance value is smaller than the distance value of the pixel itself. Therefore, the pixel A is selected during the second filtering operation.

Figure 5:
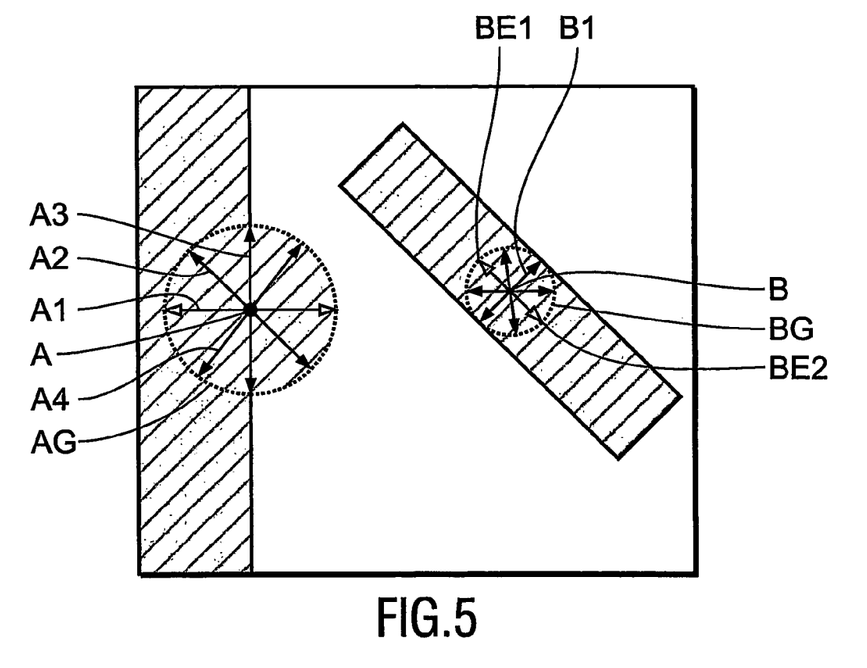
FIG. 5 is a diagrammatic representation of a nodule fused with the wall and a segment of a vessel.

Similarly, by way of example four axes with each time 180° mutually offset directions are plotted so as to extend through the pixel B. It also appears that on the axis B1 in the direct vicinity of the pixel B there are situated exclusively pixels whose distance value is smaller than that of the pixel B. Therefore, the filter element B is also selected during the second filtering operation.

Referring to FIG. 5 again, in a third filtering operation first a circular image element boundary AG, BG is drawn around the pixels A, B, said boundary extending at a distance around the pixels which is in conformity with the distance value of the pixels A, B.

The averaged distance values of the extreme points of the axis of all axes which are situated on the pixel boundaries AG and BG are compared with the distance values of the pixels A and B, respectively. As soon as during this third filtering operation an axis is found on the pixel boundaries whose mean distance value is larger than the distance value of the pixel A or B, the third filtering operation is interrupted and the pixel A or B is removed from the previously made selection.

All axes surrounding the pixel element A on the pixel boundary AG have a means distance value of the axis end points which is smaller than the distance value of the pixel A. Therefore, the pixel A remains selected during the third filtering operation.

On the boundary BG surrounding pixel B there is situated at least one axis BE1→BE2 whose mean distance value of the axis end points is not smaller than the distance value of the pixel B. The distance values of the pixels BE1 and BE2 are equal to the distance value of the pixel B. Therefore, pixel B is not selected but rejected during the third filtering operation.

Figure 6:
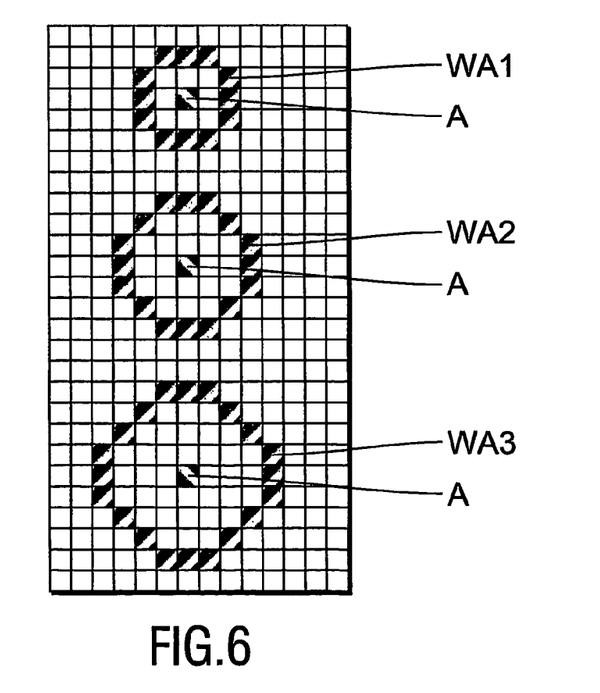
FIG. 6 is a diagrammatic representation of the point-symmetrical growth around a start element.

The pixels that remain selected after the third filtering operation are subjected to a fourth filtering operation. During this fourth filtering operation a point-symmetrical region growth is started as from these pixels A; to this end, reference is made to FIG. 6. FIG. 6 shows three growth phases of this point-symmetrical region growth. After the pixels directly adjoining the pixel A have been included by the region growth in a growth phase (not shown), in a subsequent second growth phase the elements which directly adjoin the pixels directly adjoining the pixel A are included by the region growth so that they form the growth envelope WA1 in this second growth phase. The growth envelope WA1 contains twelve pixels.

During a third growth phase of the point-symmetrical region growth the pixels which externally adjoin the growth envelope WA1 are included by the region growth and hence form the growth envelope WA2 in this third growth phase. The growth envelope WA2 comprises 16 pixels.

Subsequently, in a fourth growth phase the region growth includes 20 pixels which form the growth envelope WA3 which adjoins the pixels of the growth envelope WA2.

The start element A is rejected during the fourth filtering operation and removed from the pixels selected after the third filtering operation if during the region growth a pixel is reached whose distance value is larger than the distance value of the start element A. Moreover, the pixel A is removed from the selection and rejected as soon as the surface area included by the region growth, that is, the surface are lying within the growth envelope or the volume present therein, extends in an arbitrary direction by more than five times the distance value of the start element A.

This second criterion leads to the interruption of the filtering in respect of the start element A as soon as the growth region includes a pixel which is situated more than five times the distance value from the start element A. Furthermore, as a result of this criterion the start element A is rejected and the fourth filtering in respect of the start element A is interrupted as soon as two pixels are found which are situated so as to be mutually offset 180° relative to the start element A while the sum of the distances of these two pixels from the start element A is larger than five times the distance value of the start element A.

The start element A would be rejected on the basis of a fourth filtering as described thus far because, starting from the start element A and proceeding in a direction towards the wall structure, a pixel would be found which has a larger distance value than the start element A. However, this is undesirable, because the pixel A concerns a pixel of a potential nodular structure.

Figure 8:
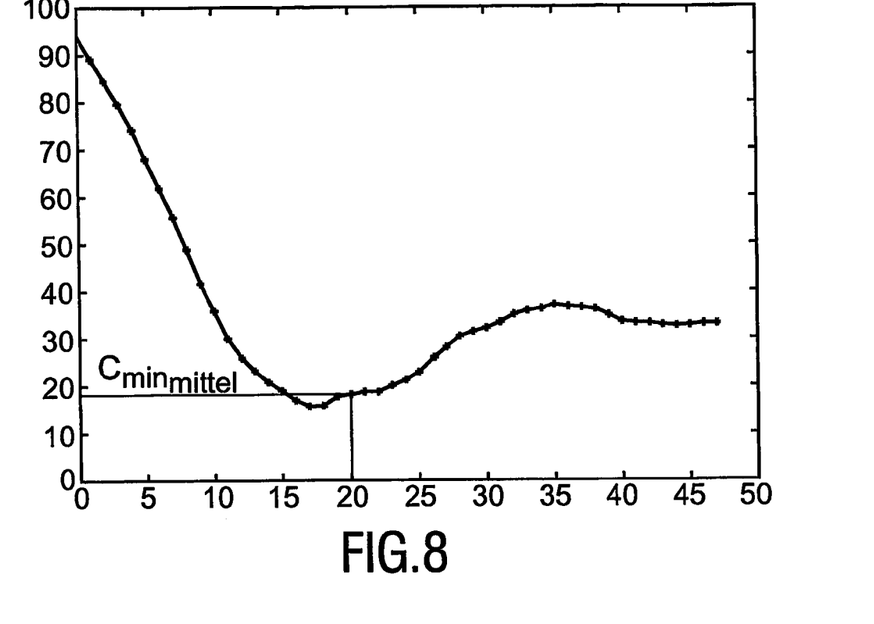
FIG. 8 shows the variation of the mean distance value in the growth envelope for a point-symmetrical growth starting from the start element characterized in FIG. 7.
Figure 14:
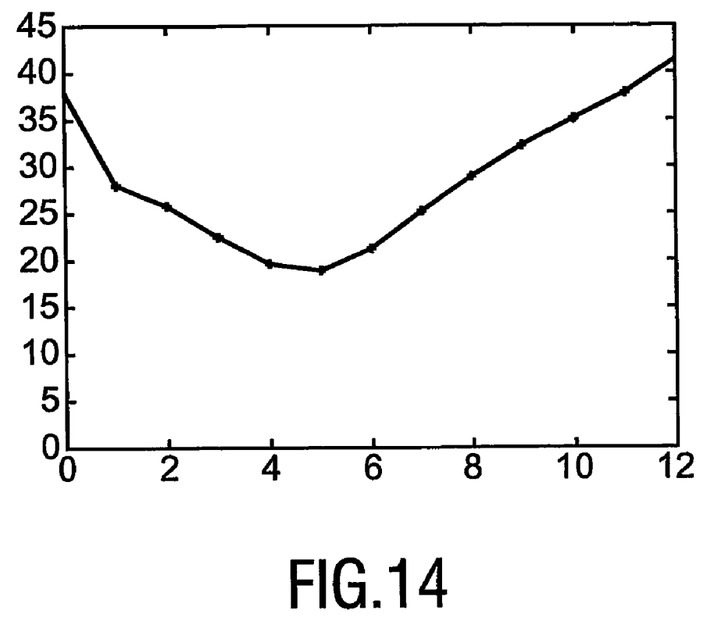
FIG. 14 shows the variation of the mean distance value in the growth envelope for the start element shown in FIG. 13.

As a first step of a further filtering operation which is based on the fourth filtering operation the mean value of all pixels in the growth envelope over the individual growth phases is plotted in conformity with the FIGS. 8 and 14.

Figure 7:
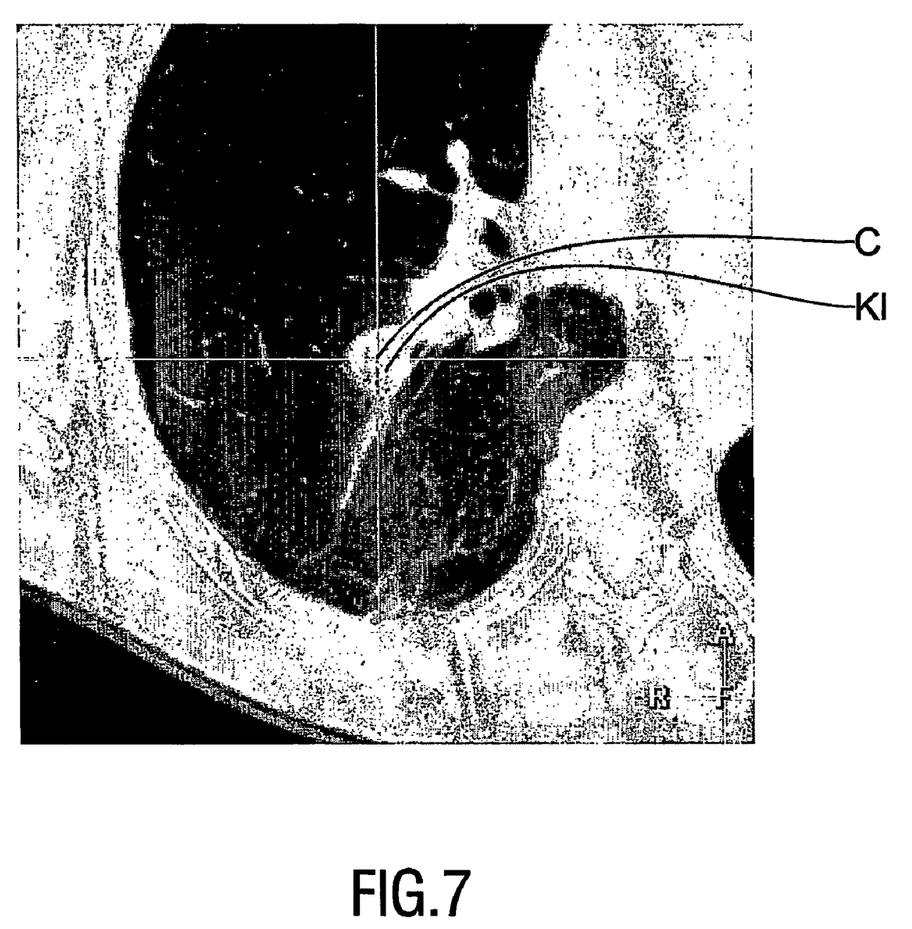
FIG. 7 shows a detail of the start element of FIG. 1 situated at the cross hairs in an isolated nodule.

FIG. 8 shows the variation of the distance mean value for a start element C, shown in FIG. 7, in an isolated nodule KI. In the diagram of FIG. 8 it can be seen that, starting from the distance value 95 of the start element C, the distance mean value first decreases during the subsequent growth phases and then assumes, after a small increase, a distance mean value of approximately 30.

Figure 13:
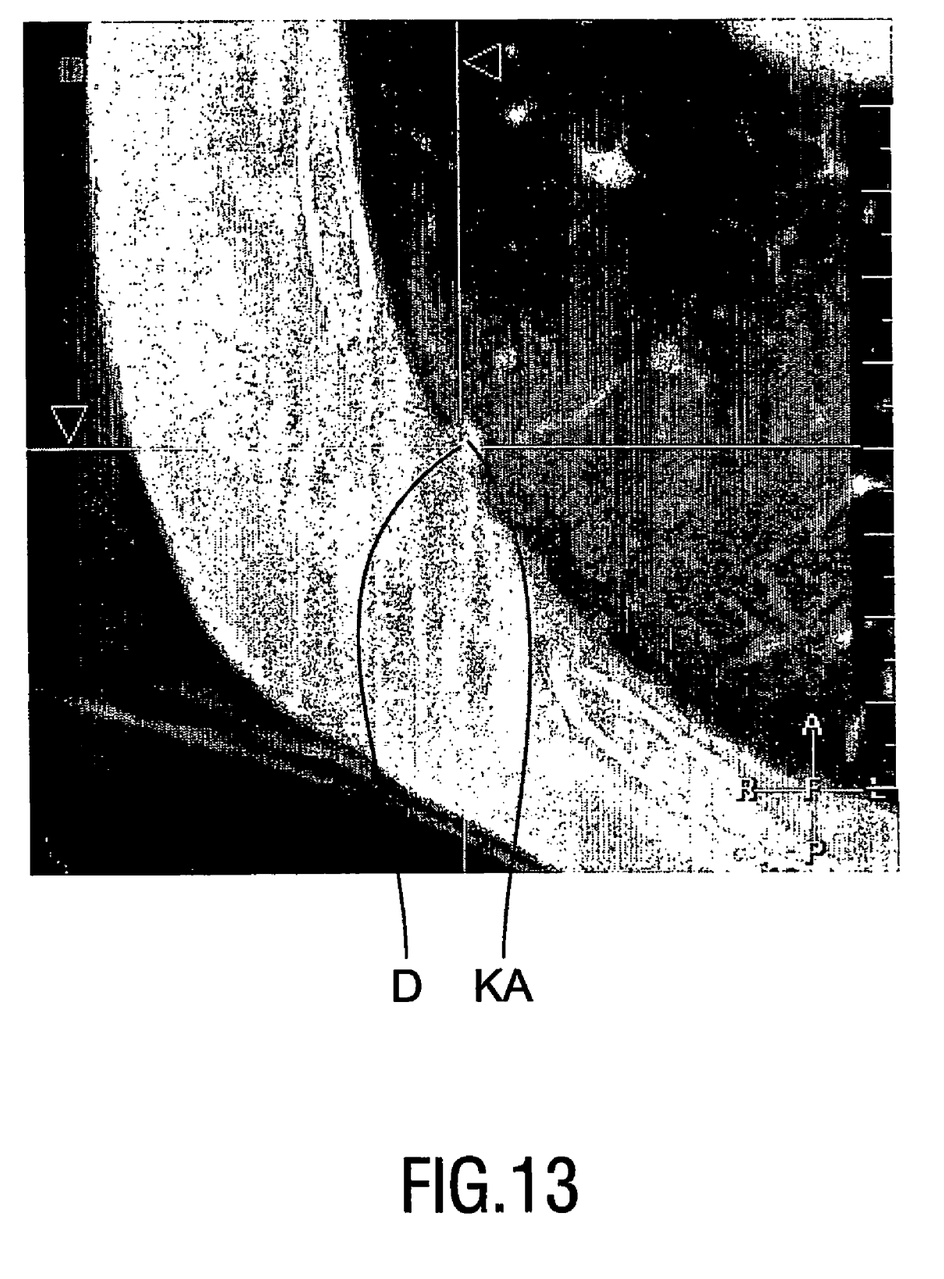
FIG. 13 shows a detail of FIG. 1 with a start element situated at the cross hairs in a nodule fused with the wall structure.

Referring to FIG. 14, the distance mean value of a start element D as shown in FIG. 13, being situated at the center of a nodule KA fused to the lung wall, also decreases as before, that is, as from the distance value 37 of the start element D, passes through a minimum and subsequently increases again. During this increase the distance mean value exceeds, approximately in the tenth growth phase, the distance value of the start element D. This is due to the fact that in the case of the start element D the region growth in this growth phase also includes pixels of the lung wall which have correspondingly high distance values and hence increase the distance mean value beyond the distance value of the start element.

The region growth is stopped as soon as the distance mean value of all pixels present within the growth envelope is larger than the distance value of the start element itself. Consequently, in the fifth filtering operation the pixel D in the nodule KA fused to the lung wall would be rejected, whereas the pixel C in the isolated nodule KI remains selected. Furthermore, the fifth filtering operation rejects all pixels belonging to image structures which no longer belong to the core of a feasible lung tumor, but are only connected thereto.

Figure 9:
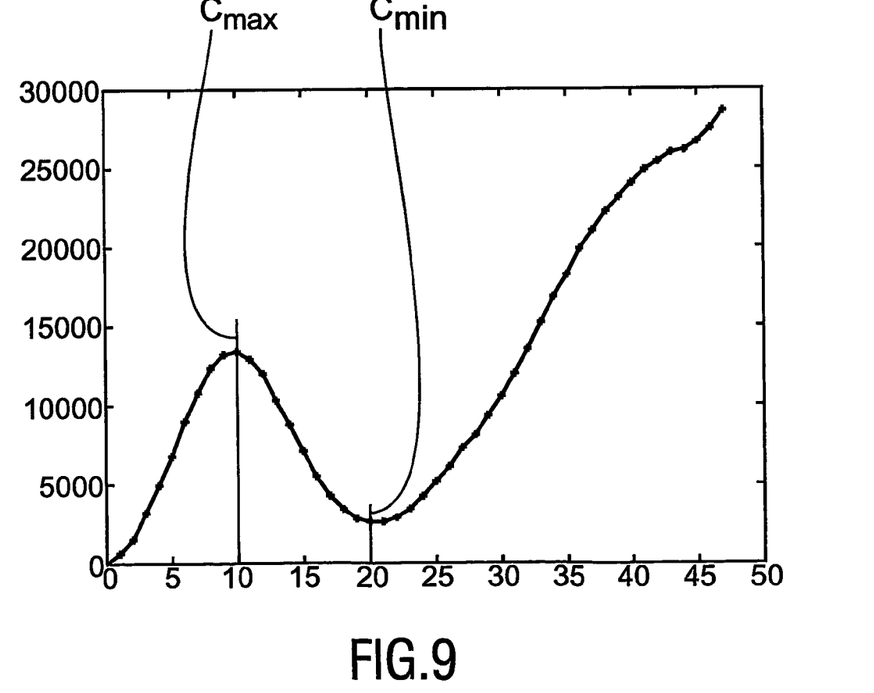
FIG. 9 shows the variation of the distance value sum in the growth envelope for the start element shown in FIG. 7, FIGS. 10 to 12 show the procedure for determining a boundary in the case of nodular structures fused with larger structures.
Figure 15:
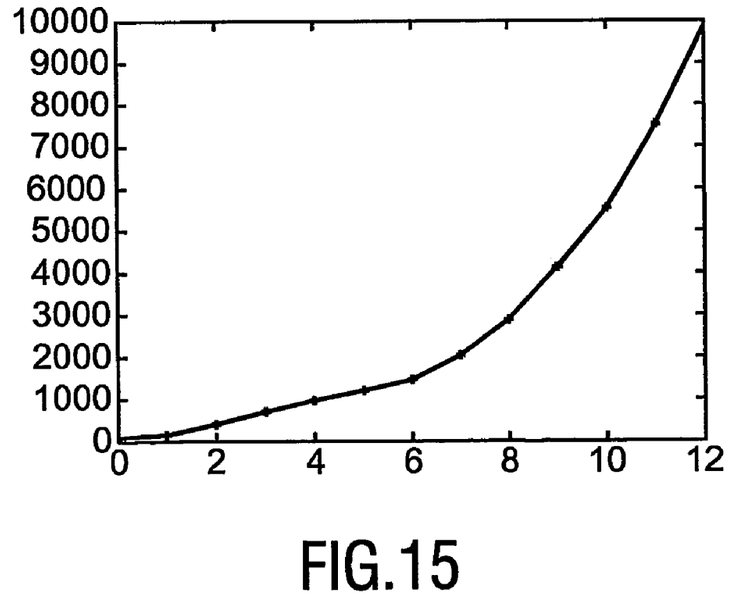
FIG. 15 shows the variation of the distance value sum in the growth envelope for the start element shown in FIG. 13.

In a further, sixth filtering operation, which is also based on the fourth filtering operation, the sum of all distance values of the pixels present in the growth envelope is plotted over the individual growth phases, so that variations in conformity with the FIGS. 9 and 15 are obtained for the start elements C and D.

For a start element C in an isolated nodule KI the curve thus plotted typically extends in the manner shown in FIG. 9. After an initial rise, due to the increasing number of pixels present within the growth envelope, a maximum Cmax is passed. After this maximum, the distance value sum decreases, due to the pixels with a small distance value which are then included in the growth envelope, and reaches a local minimum Cmin. For the rare case where the start element C is situated in a nodule which is completely isolated in the image, the local minimum Cmin at the same time constitutes the end point of the region growth, because the region growth meets the boundaries of the nodule at that instant so that it ends. Regularly, however, the isolated nodules, for example as can be seen in FIG. 7, are also traversed by vessels and hence connected to other image structures. These image structures are also included by the region growth and hence regularly lead to an increase of the distance value sum, as shown in FIG. 9, after the passage of the minimum Cmin. It has been found that the ratio of the distance value sum in the local minimum Cmin to the distance value sum in the previously occurring local maximum Cmax of the curve can be used as a criterion in deciding whether the start element is situated in a potential nodular structure. It is particularly unlikely that the start element belongs to a potential nodular structure when the ratio of Cmin to Cmax is larger than 0.35. In this case the start element is rejected and removed from the selection of the pixels remaining after the fifth filtering operation.

It has also been found that the ratio of the distance mean values to the distance value of the start element during the passage of Cmin can be used as a criterion in deciding whether the start element is situated in a potential nodular structure. This ratio of the distance mean values can be formed by transferring from FIG. 9 the growth phases of the local minimum Cmin to FIG. 8 and by reading on the y axis the distance mean value Cminmittel for these growth phases. When the ratio of the distance mean value in the local minimum, that is, Cminmittel, to the distance value of the start element is higher than 0.5, the start element is not situated within a potential nodular structure so that it can be rejected and removed from the selection of pixels remaining after the fifth filtering operation.

The two previously mentioned criteria of the sixth filtering operation remove further pixels which belong to image structures having a geometry which is not typical of nodular structures from the selection of pixels remaining after the fifth filtering operation.

It is a drawback of the fifth and the sixth filtering operation, as described before, that the filter criteria also reject pixels which belong to nodular structures fused to larger image structures. FIG. 13 shows such a nodular structure. The variation of the distance mean value and of the distance value sum associated with this nodular structure KA are shown in the FIGS. 14 and 15, respectively. It can be seen that the start element D in the nodular structure KA was rejected on the basis of the filter criteria of the fifth and the sixth filtering operation. A potential nodular structure would thus be removed from the selection.

In order to avoid the foregoing, a boundary is drawn between the nodular structure and the wall with which said nodular structure is fused, after which the fifth and the sixth filtering operation are carried out again, pixels situated beyond the boundary then being excluded from the region growth.

Figure 10:
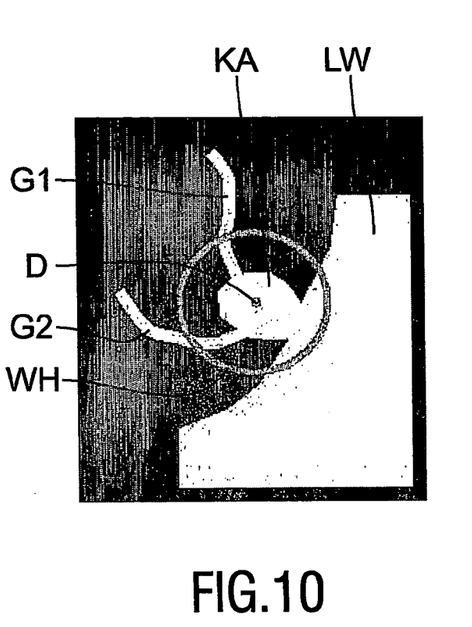
Figure 11:
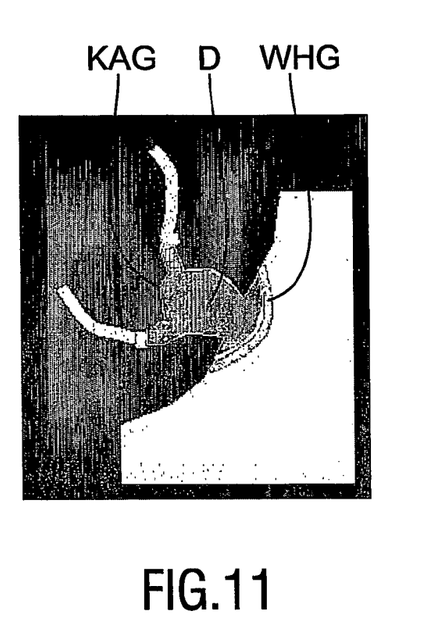
Figure 12:
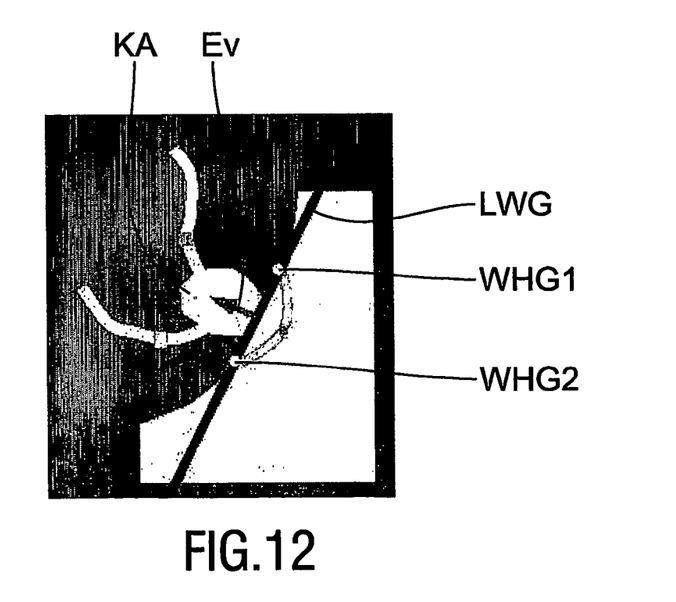

The drawing of the boundary between the nodule and the wall will be described with reference to the FIGS. 10 to 12. First all pixels are considered which are situated on the growth envelope WH in that growth phase in which one of said criteria of the fifth or the sixth filtering operation led to the interruption of the region growth and the rejection of the start element D. These pixels belong either to the lung wall LW or to vessels G1, G2 extending through the nodule KA. Using designation of the connected components (connected component labeling), from these pixels there are determined those pixels which belong to the largest coherent growth envelope structure. From the pixels of the largest growth envelope segment WHG thus determined, there are determined those pixels which are situated at the boundary of the lung wall structure, that is, WHG1 and WHG2. The pixels WHG1 and WHG2 are determined from the number of pixels which are situated within the envelope segment WHG, that is, by searching those pixels which directly adjoin pixels having a distance value equal to 0. A spatial co-variant matrix is calculated from the image structure edge elements WHG1 and WHG2 thus determined, and a main component analysis is carried out, yielding three eigenvalues and one center M, M being situated at the origin of the vector Ev on the plane LWG.

The eigenvector Ev corresponding to the smallest eigenvalue is taken as the normal to the surface of the lung wall LW. The direction of this lung wall normal is set to be such that it points inwards in the direction of the lung, that is, from the lung wall boundary LWG, determined by the eigenvector, in the direction of the node KA. This orientation can be tested by summing the projections of the pixels in the growth envelope WH on the lung wall normal. This sum must be negative when the lung wall normal vector points into the lung. In the other case the normal vector must be reversed by multiplication by −1.

After the lung wall boundary LWG has been determined in the described manner, the point-symmetrical region growth around the start element D (as described before) is repeated, subject to the additional condition that the region growth should not include any pixels which, viewed from the start element D, are situated to the other side of the lung wall boundary LWG.

Figure 16:
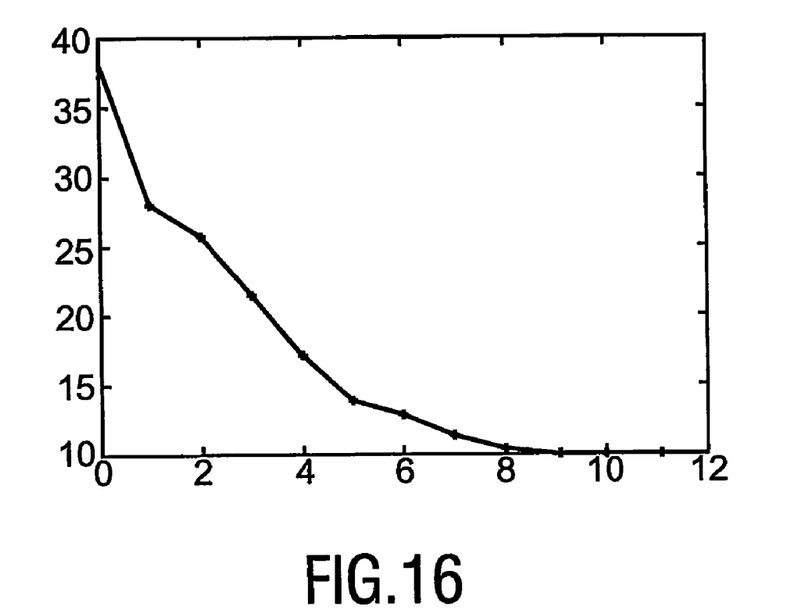
FIG. 16 shows the variation of the mean distance value in the growth envelope for the start element of FIG. 13 after the drawing of a boundary in conformity with the FIGS. 10 to 12.
Figure 17:
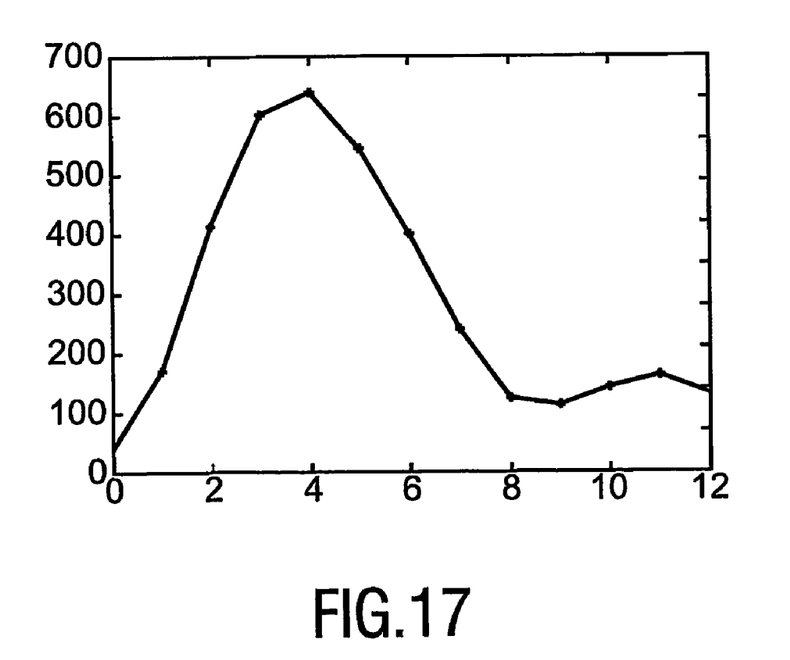
FIG. 17 shows the variation of the distance value sum in the growth envelope for the start element of FIG. 13 after the drawing of the boundary in conformity with the FIGS. 10 and 11.

When the region growth is repeated with this additional condition as regards the start element D shown in FIG. 13, the variations of the distance mean value and the distance value sum will be as shown in FIG. 16 and FIG. 17. A similar result would also be obtained if the region growth were repeated, after the corresponding drawing of the boundary, for the start element A shown in FIG. 5. The variations in conformity with FIG. 16 and FIG. 17 reveal that in this case none of the criteria of the fifth and the sixth filtering operation is satisfied, so that in conformity with the filtering operation thus modified the removal and rejection of the relevant start element from the selection of pixels of potential nodular structures is avoided.

Figure 18:
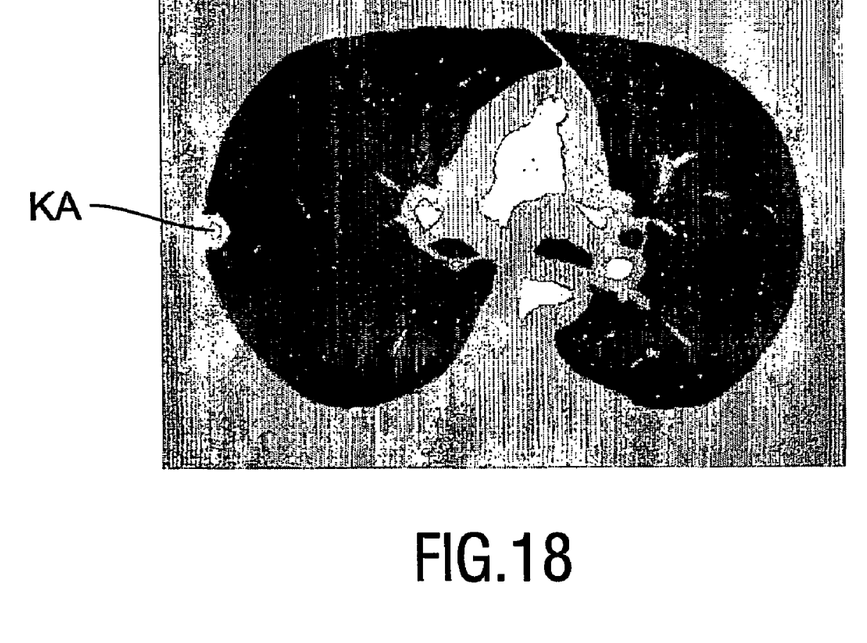
FIG. 18 shows a slice image as shown in FIG. 1 with marked potential nodule structures.
Figure 19:
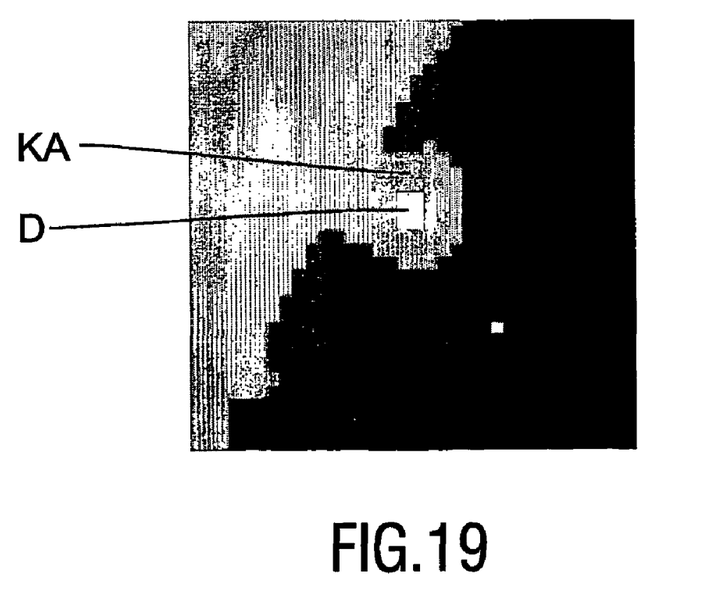
FIG. 19 shows a detail of FIG. 18.

After completion of all filtering steps, pixels which represent the center of potential nodular structures remain in the selection. In the image in conformity with FIG. 1 or FIG. 2 these pixels can be marked in white, so that subsequently an image is obtained in conformity with the FIGS. 18 and 19 in which these pixels are highlighted so that they can be readily discovered by a viewer.

The invention claimed is:

1. A method of forming an image of body structures from an image data set, notably for highlighting potential nodular structures in a lung, which method includes the steps of
   a) forming a binary data set in which the pixels present in the image data set are subdivided into pixels which are to be marked and those which are not to be marked, in which step
   a1. a first filtering operation is performed in which a distance value is determined for each pixel, which distance value corresponds to the shortest distance between the pixel and the edge of the image structure in which the pixel is situated, and in which those pixels are selected from the binary data set whose distance value is below a predetermined distance limit value,
   a2. a second filtering operation is performed in which those previously selected pixels remain selected which are directly neighbored in both directions of at least one straight line, extending through the pixel, by two pixels having a smaller distance value,
   a3. a third filtering operation is performed in which those previously selected pixels remain selected for which the surrounding pixels, situated at a distance corresponding exactly to the distance value of the pixel, have a distance value which is a predetermined distance difference value smaller than the distance value of the pixel to be tested itself,
   b) forming a marked image data set from the image data set by marking the pixels having been selected after the last filtering operation in the binary data set, and
   c) forming the image of the body structure from the marked image data set.

2. A method as claimed in claim 1, characterized in that filtering by means of limit values of the image values is performed prior to the first filtering operation.

3. A method as claimed in claim 1, characterized in that during the third filtering operation the pixel to be tested is rejected as not to be marked as soon as a surrounding pixel is found whose distance value is the predetermined distance difference value smaller than the distance value of the pixel to be tested itself.

4. A method as claimed in claim 1, characterized in that the predetermined distance difference value is zero.

5. A method as claimed in claim 1, characterized in that it comprises a fourth filtering operation in which region growth is started as from the previously selected pixels which act as a start element, and that the pixel to be tested is rejected as not to be marked:
   as soon as the region growth reaches a pixel whose distance value is larger than the distance value of the start element and/or
   when the image volume included by the region growth extends further in one direction than a predetermined volume dimension value which is preferably the distance value of the start element.

6. A method as claimed in claim 5, characterized in that the predetermined volume dimension value corresponds to five times the distance value of the start element.

7. A method as claimed in claim 5, characterized in that the region growth takes place point-symmetrically relative to the start element and that the start element is rejected as not to be marked
   as soon as the mean value of the distance values of the pixels included is larger than a predetermined distance mean value which preferably corresponds to the distance value of the start element.

8. A method as claimed in claim 5, characterized in that the region growth takes place point-symmetrically relative to the start element and that the start element is selected so as to be marked or not to be marked on the basis of an evaluation of the variation of the distance value sum, corresponding to the sum of the distance values of the pixels included by the region growth, during the progression of the region growth.

9. A method as claimed in claim 8, characterized in that the variation is plotted as a curve representing the variation of the distance value sum during the progression of the region growth and that the start element is rejected
   if the extreme value quotient of a local minimum of the curve and a previously occurring local maximum of the curve is larger than a predetermined extreme value quotient, preferably being one, and/or
   if the mean value quotient of the mean value of the distance values of the pixels included by the region growth until the local minimum is reached and the distance value of the pixel to be tested is larger than a predetermined mean value quotient, preferably being 0.5.

10. A method as claimed in claim 9, characterized in that the predetermined extreme value quotient amounts to 0.35.

11. A method as claimed in one of the claims 5 to 9, characterized in that it comprises a fifth filtering operation in which the pixels which have not been selected during the fourth filtering operation are selected if they belong to a first image structure which is fused with a second image structure, in that
   the boundary between the first and the second image structure is approached, the region growth in conformity with the claims 5 to 9 is repeated, those pixels which are situated, viewed from the start element, beyond the boundary then remaining excluded from the region growth, and the start element is selected if none of the conditions in conformity with the claims 4 to 8 is satisfied.

12. A method as claimed in claim 11, characterized in that the boundary is determined in that a spatial co-variant matrix is calculated from all pixels which are situated at the edge of the region growth in the growth phase, and whose distance value is below a given value or which are situated in the edge zone of an image structure, a main component analysis is calculated from the co-variant matrix and the eigenvector of the smallest eigenvalue resulting from the main component analysis is used as the surface normal to the boundary.

13. A device for forming an image of body structures from an image data set, notably for highlighting potential nodular structures in a lung, which device comprises a) means for forming a binary data set by subdividing the pixels present in the image data set into pixels which are to be marked and those which are not to be marked, including a1. means for performing a first filtering operation in which a distance value of the previously filtered pixels is determined, which distance value corresponds to the shortest distance between the pixel to be tested and the edge of the image structure in which the pixel to be tested is situated, those previously filtered pixels of the binary data set being selected whose distance values are below a predetermined distance limit value, a2. means for performing a second filtering operation in which those previously filtered pixels are selected which are surrounded only by pixels having a smaller distance value at a distance which corresponds to or is smaller than the distance value of the pixel at least along one straight line which extends through the pixel, a3. means for performing a third filtering operation during which those previously filtered pixels are selected for which the surrounding pixels, being situated at a distance corresponding to the distance value of the pixel, have a distance value which is a predetermined distance difference value smaller than the distance value of the pixel to be tested itself, b) means for forming a marked image data set from the image data set by marking the pixels having been selected after the last filtering operation in the binary data set, and c) means for forming the image of the body structure from the marked image data set.

14. A computer readable medium storing a computer program for forming an image of body structures from an image data set, which carry out the steps of the methods disclosed in claim 1.

* * * * *